Figure 2:
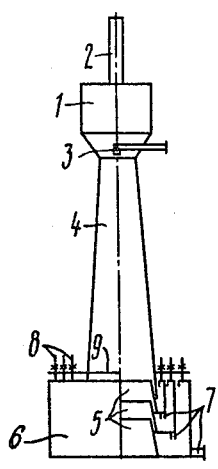

United States Patent [19]

Piterskikh et al.

[11] 4,265,617

[45] May 5, 1981

[54] APPARATUS FOR SPRAY DRYING OF LIQUID AND PASTE-LIKE MATERIALS

[76] Inventors: Georgy P. Piterskikh, ulitsa Garibaldi, 4, korpus 1, kv. 11; Stanislav A. Sukhov, Gostinichny proezd, 4A, kv. 71; Vladimir B. Slobodchikov, ulitsa Tukhachevskogo, 33, kv. 21, all of Moscow; Ivan S. Sutyagin, Krasnoperekopsky raion, poselok Armyansk, I mikroraion, 10, kv. 62; Albert M. Terentiev, Krasnoperekopsky raion, poselok Armyansk, I mikroraion, 3, kv. 97, both of Krymskaya oblast, all of U.S.S.R.

[21] Appl. No.: 86,071

[22] Filed: Oct. 18, 1979

[51] Int. Cl.$^3$ ............................................. F27B 15/00
[52] U.S. Cl. ..................................... 432/58; 159/4 R; 432/25
[58] Field of Search ........................... 432/17, 25, 58; 159/4 R, 4 A

[56] References Cited

U.S. PATENT DOCUMENTS

| | | | |
|---|---|---|---|
| 2,441,594 | 5/1948 | Ramseyer | 432/58 |
| 2,666,632 | 1/1954 | Culver et al. | 432/58 |
| 3,618,655 | 11/1971 | Lockwood | 159/4 A |
| 4,183,145 | 1/1980 | Piterskikh et al. | 159/4 R |

*Primary Examiner*—John J. Camby

*Attorney, Agent, or Firm*—Haseltine and Lake

[57] ABSTRACT

An apparatus for spray drying of liquid and paste-like materials comprises a chamber for combustion of a gaseous drying medium passing therein in a pulsating flow, which chamber has an inlet pipe for feeding therein the gaseous drying medium, coaxial with the chamber. Mounted into the chamber is a pipe for injecting the liquid or paste-like materials, a portion of the pipe being disposed on the centerline of said chamber in the direction of travel of the gaseous drying medium flow. An exhaust pipe is mounted in a coaxial relationship to said chamber at the end thereof opposite to the inlet pipe for feeding the gaseous drying medium. The apparatus has also at least one shroud (baffle) in the form of a truncated cone facing by its smaller base the interior of said chamber and positioned in a coaxial relationship thereto. The first shroud in the direction of travel of the atomized material flow is positioned directly in said exhaust pipe in a spaced relationship thereto to define a gap therebetween. In addition, the apparatus includes at least one toroidal resonator chamber encompassing said shroud, at least the first resonator chamber in the direction of travel of the material flow partly encompassing also the exhaust pipe and communicating therewith through the gap between the shroud and the same pipe. Each resonator chamber has a passage for withdrawing therefrom the unatomized material passing into the inner space through said gap from the exhaust pipe.

8 Claims, 9 Drawing Figures

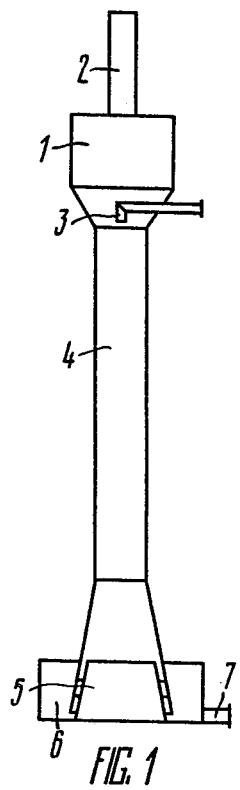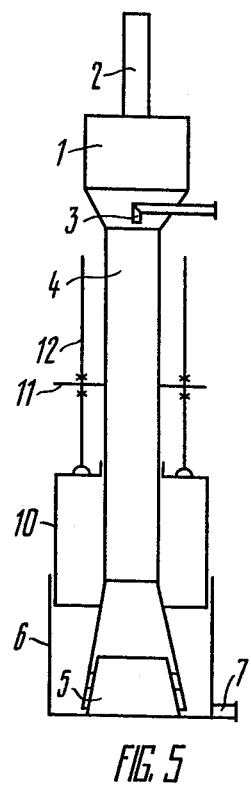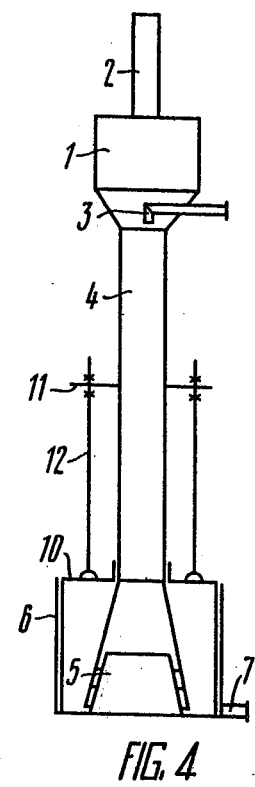

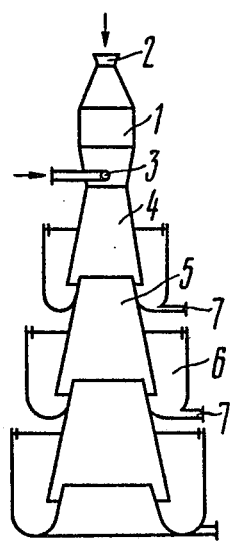
FIG. 8
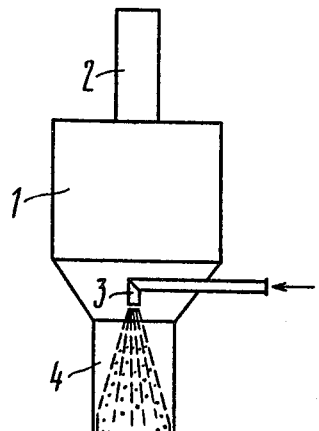
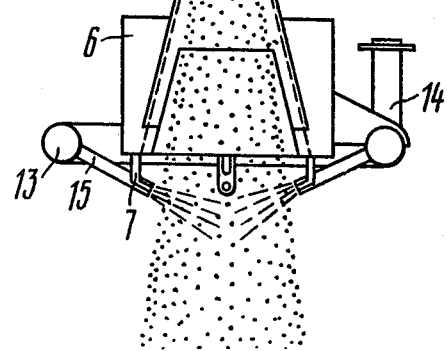
FIG. 9

APPARATUS FOR SPRAY DRYING OF LIQUID AND PASTE-LIKE MATERIALS

FIELD OF THE INVENTION

The invention relates to the art of drying with the use of high-velocity flows of a gaseous spraying medium and is specifically concerned with an apparatus for spray drying liquid and paste-like materials, employed in the chemical, microbiological, and other branches of industry.

The invention can be employed to the best advantage in the chemical industry, to produce fertilizers and dyestuffs; in the microbiological industry, to produce fodder yeast; and also in the building materials industry, to produce ceramic products.

BACKGROUND OF THE INVENTION

The problem of providing an apparatus for spray drying liquid and paste-like materials, which offer a high capacity at a low power consumption and hence also a high rate of spray drying, ensuring at the same time a high quality of the finished product, still remains to be adequately solved.

The high quality of the finished product implies a state of the atomized product, close to a monodispersed one, with a uniform size of the particles.

Attempts have been undertaken to solve the problem, if only in part, through the use of high-temperature products of combustion of a fuel-air mixture as the spraying medium in the apparatus for spray drying liquid and paste-like materials. This offers simultaneous atomization and drying of said materials, thereby intensifying the process of making the finished product.

There is known, for example, an apparatus for drying the above-specified materials by spraying in a steady-state flow, disclosed in the USSR Inventor's Certificate No. 157,279, Int. Cl.$^2$ BO58B 3/18, which apparatus comprises a chamber with a nozzle to introduce a high-velocity flow of the gaseous drying medium, a fuel-air mixture, and a means to inject a liquid or paste-like starting material, disposed on the axis of the nozzle.

In this apparatus, however, the atomized material has a non-uniform size of particles, which is due to the regularities of the process of decomposition of the starting material in a steady-state gas flow.

This causes difficulties in the subsequent heat treatment of the material and impairs the quality of the finished product. Moreover, utilizing the maximum temperatures of the combustion products in this apparatus is impossible because of a low heat resistance of the structural materials employed to manufacture the apparatus of such a type. This factor necessitates an additional mixing of the combustion products with air to lower the temperature, which entails a higher power consumption and impairs the technical and economic efficiency of the production process as a whole.

Closer in the technical substance and efficiency to the present invention is an apparatus for spray drying of liquid and paste-like materials in an unsteady flow of a gaseous drying medium, disclosed in U.S. Pat. No. 3,618,655, U.S. Cl. 159-4. The apparatus comprises a cylindrical chamber for combustion of a fuel-air mixture coming into the chamber in a pulsating flow, which chamber has a coaxial inlet pipe for the inflow of said mixture and a sprayer for injection of liquid or paste-like materials, said materials being injected along the centerline of said chamber in the direction of travel of the fuel-air mixture flow. At the opposite (with respect to the fuel-air mixture inlet pipe) end of said chamber, an exhaust pipe is mounted wherein simultaneous atomization and drying of the liquid or paste-like material are accomplished.

The apparatus functions as follows.

A fuel-air mixture is fed by portions into said chamber in a conventional manner and ignited, e.g., by a spark plug. The combustion of a portion of said mixture causes the pressure in said chamber to increase; the increased pressure acts upon, e.g., a check valve to shut off temporarily the access of the next portion of the fuel-air mixture. The combustion products rush into the exhaust pipe. The energy of the gas mass flowing out through the exhaust pipe creates a partial vacuum in the chamber so that the valve opens, the next portion of the fuel-air mixture fills the chamber and ignites from the residual combustion products. The filling, ignition, and exhaust processes follow one another at a definite frequency and amplitude. After the apparatus has come to a stable running, a liquid or paste-like starting material is injected into the chamber through the sprayer. The fuel-air mixture combustion products rushing at a high velocity into the exhaust pipe entrain the starting material and atomize it. The atomized material is dried due to contact with the combustion products.

This prior art apparatus provides for utilizing the maximum temperatures of the fuel-air mixture combustion products, but, as pointed out in said patent, features a very high level of noise, on the order of 130 dB, which prevents its commercial employment without special acoustical protection means and hence entails an extra cost. Moreover, some part of the liquid or paste-like starting material gets onto the exhaust pipe walls, which results in formation of a film or of coarse particles respectively and consequently reduces the rate of the drying and atomization processes as well as impairing the quality of the finished products.

SUMMARY OF THE INVENTION

The object of the present invention is to provide an apparatus for spray drying liquid and paste-like materials, which is free of the above-mentioned disadvantages and makes it possible to intensify the spray drying process and to considerably reduce the noise level at a low material and power consumption.

Another important object of the invention is to upgrade the quality of the finished product.

Still another object of the invention is to upgrade the economic efficiency of the apparatus and of the spray drying process by means of removing and reusing the starting material which settles on the exhaust pipe walls.

Yet another object of the invention is to upgrade the quality of atomization by excluding from the flow the most coarse particles moving along the exhaust pipe wall.

A not less important object of the invention is to optimize the suppression of noise over a broad range of frequencies in accordance with the parameters of the change of the state of the gaseous drying medium.

Other objects and advantages of the invention will be apparent from the detailed description thereof with reference to the accompanying drawings.

The above-mentioned objects are attained by an apparatus for spray drying liquid and paste-like materials, comprising a chamber for combustion of the gaseous drying medium, a fuel-air mixture, passing therein in a pulsating flow; an inlet pipe for feeding the gaseous drying medium into said chamber, disposed on the axis thereof; a pipe for injecting said materials into said chamber, a portion of the pipe being disposed on the centerline of said chamber in the direction of travel of the gaseous drying medium flow; an exhaust pipe mounted in a coaxial relationship to said chamber at the end thereof opposite with respect to the inlet pipe for feeding the gaseous drying medium, which, according to the invention, has at least one shroud (baffle) in the form of a truncated cone facing by its smaller base inside said chamber and positioned in a coaxial relationship thereto, the first shroud in the direction of travel of the material flow being positioned directly in said exhaust pipe in a spaced relationship thereto to define a gap therebetween; at least one toroidal resonator chamber encompassing said shroud, at least the first resonator chamber in the direction of travel of the atomized material flow partly encompassing also the exhaust pipe and communicating with the inner space thereof through the gap between the shroud and said exhaust pipe; and a passage for withdrawing the unatomized material from the inner space of said resonator chamber, provided in the wall thereof.

Such an arrangement of the apparatus for spray drying liquid and paste-like materials makes it possible to substantially intensify the spray drying process by means of withdrawing through the resonator chambers the material which moves along the exhaust pipe wall to return it subsequently into the zone of atomization and drying, and thereby to considerably upgrade the uniformity and, hence, the quality of the finished product. In addition, the provision of the resonator chambers, as has been previously pointed out, promotes an efficient noise suppression with essentially no increase in the material and power consumption.

When a plurality of shrouds is used, it is advisable that these form a system of coaxial identical truncated cones partly inserted into one another to define a gap therebetween and adapted for an axial displacement.

This arrangement will provide for the maximum removal of the starting material from the walls of the exhaust pipe and of the cone shrouds with a varying thickness of the film of a liquid material or a varying diameter of coarse particles of a paste-like material, whose particle size is dependent on the weight ratio between the starting material and the atomizing medium.

To optimize the suppression of noise over a broad range of frequencies in accordance with the parameters of the change of the state of the gaseous drying medium, the resonator chambers are provided with a means for varying their volume.

For more efficiently removing the starting material from the walls of the exhaust pipe and of the cone shrouds and returning it into the zone of atomization, it is advisable that the apparatus comprise a special means communicating through the passage for the withdrawal of the material with the inner space of the resonator chamber, and through another, specially provided passage, with the inner space of one of said shrouds. This arrangement will considerably upgrade the economic efficiency of the spray drying process, since then essentially the entire material will be utilized in making the finished product.

The invention will now be explained by way of a detailed description of particular embodiments thereof with reference to the accompanying drawings.

BRIEF DESCRIPTION OF THE DRAWINGS

In the accompanying drawings:

FIG. 1 is a diagrammatical view of an apparatus for spray drying liquid and paste-like materials according to the invention, comprising at least one shroud and a resonator chamber;

FIG. 2 is a diagrammatic view of a modification of the apparatus, which comprises a system of cone shrouds adapted for an axial displacement, with the minimum gap therebetween;

FIG. 3 shows the same as in FIG. 2, but with the maximum gap between the shrouds;

FIG. 4 is a diagrammatic view of a modification of the apparatus, comprising one cone shroud and a resonator chamber provided with a means for varying its volume, the means being shown in the initial position;

FIG. 5 shows the same as in FIG. 4, but with the means for varying the resonator chamber volume in the extreme working position;

FIG. 6 is a diagrammatic view of a modification of the apparatus, which comprises a system of cone shrouds and correspondingly of resonator chambers provided with means for varying their volume, the means being shown in the initial position;

FIG. 7 shows the same as in FIG. 6, but with the means for varying the resonator chamber volume in the extreme working position;

FIG. 8 is a diagrammatic view of still another modification of the apparatus, comprising a system of cone shrouds and resonator chambers (the means for varying the volume of said chamber and for axially displacing the shrouds are not shown);

FIG. 9 is a diagrammatic view of an apparatus for spray drying liquid and paste-like materials according to the invention, which comprises a means for returning the unatomized material into the zone of atomization.

DETAILED DESCRIPTION OF THE INVENTION

Referring to FIG. 1, an apparatus for spray drying liquid and paste-like materials comprises a cylindrical chamber 1 for combustion of a gaseous drying medium, the fuel-air mixture combustion products, passing therein in a pulsating flow, which chamber has an inlet pipe 2 for feeding the mixture into said chamber 1, disposed on the axis thereof. The apparatus comprises also a pipe 3 for injecting liquid or paste-like materials into said chamber 1, at least a portion of the pipe 3 being disposed on the centerline of the chamber 1 in the direction of travel of the fuel-air mixture flow. An exhaust pipe 4 is mounted in coaxial relationship to the chamber 1 at the end thereof opposite with respect to the inlet pipe 2. A shroud 5 in the form of a truncated cone whose smaller base faces into the interior of said chamber is installed directly in the exhaust pipe in coaxial spaced relation thereto. Said shroud 5 and partly the exhaust pipe 4 are encompassed by a toroidal resonator chamber 6 which communicates with the inner space of the exhaust pipe 4 through the gap between the inner surface of the latter and the outer surface of the shroud 5. A passage 7 for withdrawing from the inner space of the resonator chamber 6 the unatomized material coming into the inner space through said gap from the exhaust pipe 4 is provided in the wall of the resonator chamber 6. Such an arrangement, as has already been pointed out, makes it possible to substantially intensify the spray drying process by means of withdrawing through the resonator chamber 6 the unatomized material which moves along the wall of the exhaust pipe 4 for subsequently returning it into the zone of atomization and drying, and thereby also to upgrade the uniformity and hence the quality of the finished product. Moreover, the provision of the resonator chamber, as has been previously pointed out, promotes an efficient noise suppression with essentially no increase in the material and power consumption. For the maximum removal of the starting material from the walls of the exhaust pipe and of the shrouds with a varying thickness of the film of a liquid material, formed on the walls, or a varying diameter of coarse particles of a paste-like material, the apparatus may comprise a system of coaxial identical cone shrouds 5 partly inserted into one another to define a gap therebetween and adapted for an axial displacement. A modification is expedient (see FIGS. 2, 3), wherein the resonator chambers 6 are arranged in a concentric relationship to one another, rigidly secured to the shrouds 5, and provided with means for axially displacing the shrouds 5, which means have the form of pull rods 8 each connected to its respective chamber 6 and to a common bracket 9 which is rigidly attached to the exhaust pipe 4.

It will be readily apparent that the axial displacement of the shrouds 5 can be accomplished also by other known methods.

To optimize the suppression of noise over a broad range of frequencies in accordance with the parameters of the change of the state of the drying medium, one or more of the resonator chambers 6 may be provided with means for varying their volume as illustrated in FIGS. 4 to 7.

Such a means may be, e.g., a toroidal chamber 10 directed oppositely to, and entering in a telescopic manner, the resonator chamber 6 and linked through pull rods 12 to a bracket 11 rigidly secured to the exhaust pipe 4 (see FIGS. 4, 5).

When a plurality of the shrouds 5 and resonator chambers 6 is used (see FIGS. 6, 7), each resonator chamber 6 is provided with means for varying its volume. Such means may, e.g., also be the toroidal chamber 10 directed oppositely to the chambers 6 and entering the latter in a telescopic manner; the chambers 10 may be displaced with respect to one another with the use of a threaded joint.

It will be readily understood that this method may also be employed to relatively displace the chambers in the preceding modification, and that pull rods secured to a bracket may be employed for the same purpose in the modification under consideration.

The most efficient noise suppression and intensification of the spray drying process are attained in a modification wherein the shrouds 5 are adapted for an axial displacement and the resonator chambers 6 are provided with means for varying their volume.

FIG. 8 represents still another modification of the system of the shrouds 5 with the resonator chambers 6 (the means for axially displacing the shrouds 5 and for varying the volume of the chambers 6 are not shown). It will be clear that they may take the same form as in the previously discussed modifications.

Referring now to FIG. 9, the apparatus has a means for returning the unatomized material into the zone of atomization and drying, which means is a header 13 comprising a pipe 14 to be fed therethrough with compressed air and a nozzle 15 communicating with the passage 7 for withdrawing the unatomized material from the resonator chamber 6 and directed towards the zone of atomization and drying, as shown in the Figure.

Figure 3:
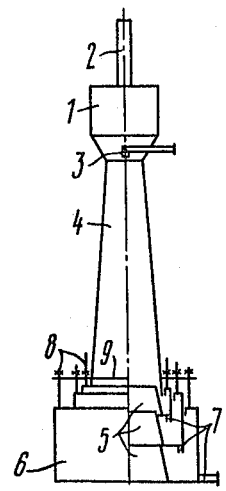
Figure 6:
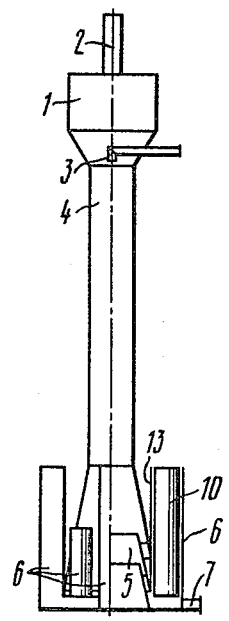
Figure 7:
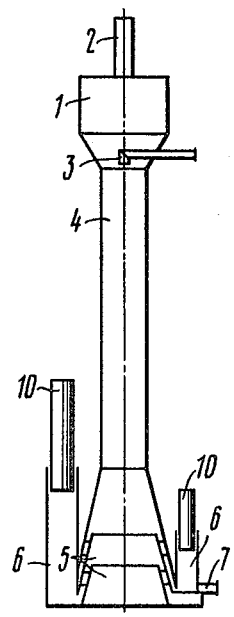

When a system of the shrouds 5 is used, the passage 7 for withdrawing the unatomized material communicates the inner space of each next resonator chamber 6, except the last one, with the inner space of the preceding chamber 6 (see FIGS. 2, 3). In the last chamber, the passage 7, as in the preceding modification (see FIG. 9), communicates with the nozzle 15 of the means for returning the unatomized material into the zone of atomization and drying.

According to the invention, in a modification of the apparatus with the means for returning the unatomized material into the zone of atomization and drying it is also preferable that the shrouds 5 are partly inserted into one another in a spaced coaxial relationship and adapted for an axial displacement, and the resonator chambers 6 are provided with means for varying the volume thereof, as in the previously discussed modifications.

The apparatus for spray drying liquid and paste-like materials functions as follows.

A fuel-air mixture passes in a pulsating flow into the chamber 1 through the inlet pipe 2 and is ignited in a known manner, such as by means of a spark plug. A liquid or paste-like starting material is injected through the pipe 3 in the direction of travel of the fuel-air mixture flow along the centerline of the chamber 1 (see FIG. 9).

As the state of the drying medium, in this instance, of the fuel-air mixture, changes, a shock wave originates in the chamber 1, and the front of the shock wave acts upon the starting material. The starting material gets atomized; the action of the front of the direct shock wave upon the starting material gives rise to an oblique shock wave, the angle of whose front with the longitudinal axis of the exhaust pipe 4 depends on the parameters of the incoming flow of the fuel-air mixture combustion products (on the Mach number), i.e. a certain limiting deflection of the flow which cannot be exceeded, whatever the position of the shock wave front, corresponds to each value of the Mach number. It follows that the deflection of the two-phase flow consisting of the gaseous drying medium and the atomized material depends on the direction of the oblique shock wave and is within the range of 0° to 92°.

To diminish the interaction of the atomized material with the wall of the exhaust pipe 4, the exhaust pipe 4 is provided with cone shrouds 5 whose flare angle depends on the parameters of the state of the gaseous drying medium. Nevertheless, some part of the material moves along the wall of the exhaust pipe 4 and is braked by the wall; this results in formation of coarse particles of a paste-like material or of a film of a liquid material and hence impairs the quality of the atomization. The coarse particles or the liquid material flowing down the wall of the exhaust pipe 4 get into the adjustable gap between the movable shrouds 5 and are withdrawn through passages 7 in the resonator chambers 6 (FIGS. 2, 3 and 9) into the nozzle 15 of the means for returning the starting material into the zone of atomization. Compressed air fed through the inlet pipe 14 and the header 13 of this means into the nozzle 15 entrains said material and carries it over into the zone of atomization and drying. Moving in the exhaust pipe 4, the atomized starting material intensely cools the gaseous drying medium and concurrently absorbs a portion of the acoustic energy released in the decay of the shock wave. The atomized material travels predominantly in the core portion of the flow, whereas a part of the gaseous drying agent flows along the wall. The noise suppression is accomplished by breaking the outside boundary flow or boundary layer of the gaseous drying medium away into the resonator chambers 6.

The resonator chambers are of a variable or adjustable volume, which is provided with the aim of optimizing the suppression of noise over a broad range of frequencies in accordance with the change of the state of the gaseous drying medium. FIGS. 4 and 6 show the initial position when the volume of the chamber 6 is not increased, and FIGS. 5 and 7, the extreme working position of the means for varying or adjusting the volume of the chamber 6.

Thus, the above-disclosed apparatus for spray drying liquid and paste-like materials makes it possible to considerably improve the uniformity of the atomized material and hence to upgrade the quality of the finished product, to intensify the spray drying process, and to greatly reduce the noise level (down to the sanitary standards) with essentially no increase in the material and power consumption and at a high economic efficiency of production of a dry product.

It will be apparent that the invention may be variously otherwise embodied without departure from the spirit and scope thereof as defined in the appended claims.

What is claimed is:

1. An apparatus for spray drying liquid and paste-like materials, comprising:

a chamber for combustion of a gaseous drying medium passing therein in a pulsating flow;

an inlet pipe for feeding the gaseous drying medium into said chamber, disposed on the axis thereof;

a pipe for injecting said materials into said chamber, a portion of the pipe being disposed on the centerline of said chamber in the direction of travel of the gaseous drying medium flow;

an exhaust pipe mounted in a coaxial relationship to said chamber at the end thereof opposite to the inlet pipe for feeding the gaseous drying medium;

at least one baffle in the form of a truncated cone facing by its smaller base the interior of said chamber and positioned in a coaxial relationship thereto, at least the first baffle in the direction of travel of the material flow being positioned directly in said exhaust pipe in a spaced relationship thereto to define a gap therebetween;

at least one toroidal resonator chamber encompassing said baffle, at least the first resonator chamber in the direction of travel of the material flow partly encompassing also the exhaust pipe and communicating with the inner space thereof through the gap between the baffle and said exhaust pipe; and a passage for withdrawing the unatomized material from the inner space of the resonator chamber, provided in the wall thereof.

2. An apparatus as defined in claim 1, wherein said baffles form a system of coaxial identical truncated cones partly inserted into one another to define a gap therebetween and adapted for an axial displacement.

3. An apparatus as defined in claim 1, wherein the resonator chambers are provided with means for varying the volume thereof.

4. An apparatus as defined in claim 1, wherein said baffles form a system of coaxial identical truncated cones partly inserted into one another to define a gap therebetween and are provided with means for axial displacement, and the resonator chambers are provided with means for varying the volume thereof.

5. An apparatus for spray drying of liquid and paste-like materials, comprising:

a chamber for combustion of a gaseous drying medium passing therein in a pulsating flow;

an inlet pipe for feeding the gaseous drying medium into said chamber, disposed on the axis thereof;

a pipe for injecting said materials into said chamber, a portion of the pipe being disposed on the centerline of said chamber in the direction of travel of the gaseous drying medium flow;

an exhaust pipe mounted in a coaxial relationship to said chamber at the end thereof opposite to the inlet pipe for feeding the gaseous drying medium;

at least one baffle in the form of a truncated cone facing by its smaller base the interior of said chamber and positioned in a coaxial relationship thereto, at least the first baffle in the direction of travel of the material flow being positioned directly in said exhaust pipe in a spaced relationship thereto to define a gap therebetween;

at least one toroidal resonator chamber encompassing said cone baffle, at least the first resonator chamber in the direction of travel of the material flow partly encompassing also said exhaust pipe and communicating with the inner space thereof through the gap between the baffle and said exhaust pipe;

a passage for withdrawing the unatomized material from the inner space of the resonator chamber, provided in the wall thereof;

a means for returning the unatomized material into the zone of atomization, communicating through said passage with the inner space of the resonator chamber and through another, specially provided passage, with the inner space of one of said baffles.

6. An apparatus as defined in claim 5, wherein said baffles form a system of coaxial identical truncated cones partly inserted into one another to define a gap therebetween and are provided with means for axial displacement.

7. An apparatus as defined in claim 5, wherein the resonator chambers are provided with means for varying the volume thereof.

8. An apparatus as defined in claim 5, wherein said baffles form a system of coaxial identical truncated cones partly inserted into one another to define a gap therebetween, and the resonator chambers are provided with means for varying the volume thereof.

* * * * *